April 2, 1968     W. W. SWANQUIST     3,376,005
ELECTRICAL BOX MOUNTING CLIP FOR USE WITH METAL STUDS
Filed Aug. 20, 1965     2 Sheets-Sheet 1

INVENTOR.
Wesley W. Swanquist,
BY
Mann, Brown & McWilliams
ATTORNEYS.

April 2, 1968 W. W. SWANQUIST 3,376,005
ELECTRICAL BOX MOUNTING CLIP FOR USE WITH METAL STUDS
Filed Aug. 20, 1965 2 Sheets-Sheet 2
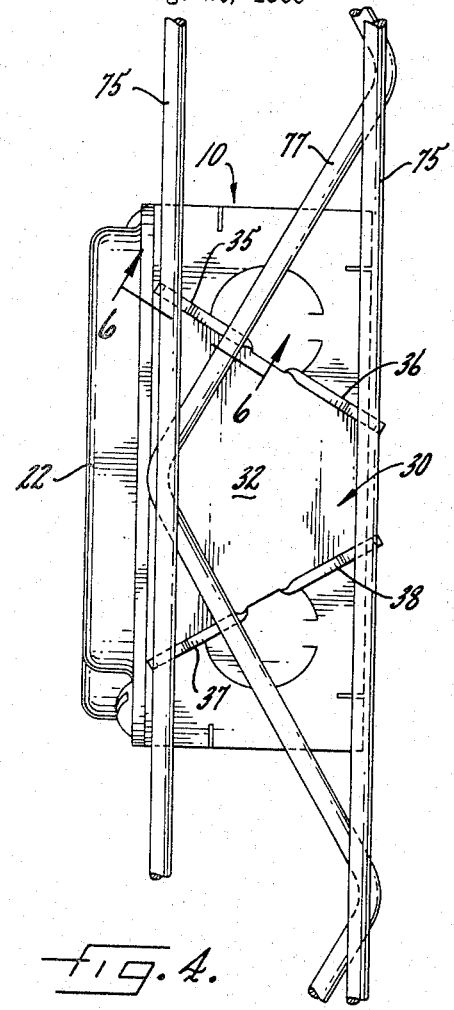
fig. 4.
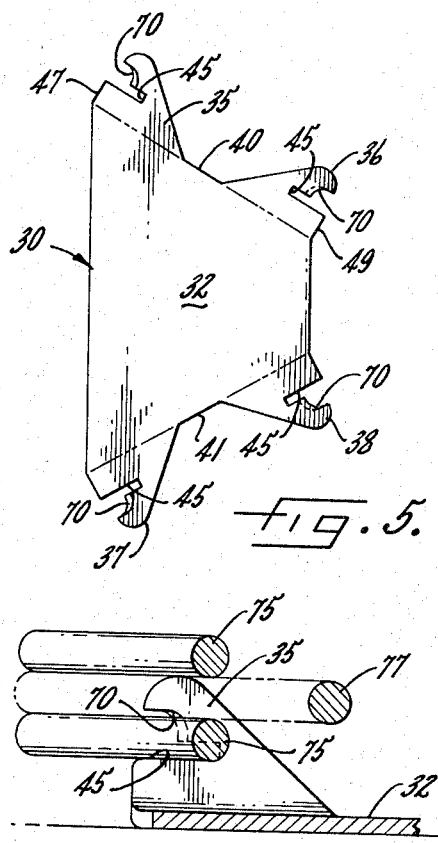
fig. 5.
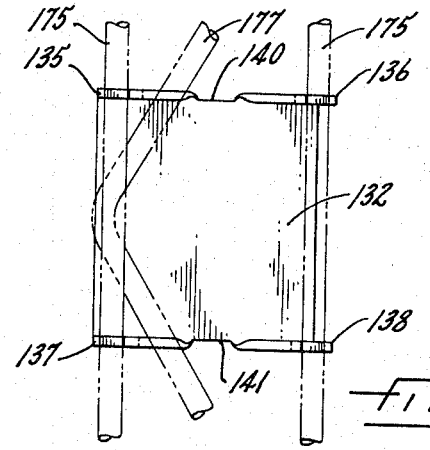
fig. 6.
fig. 7.
INVENTOR.
Wesley W. Swanquist,
BY
Mann, Brown & McWilliams
ATTORNEYS.

United States Patent Office 3,376,005
Patented Apr. 2, 1968

3,376,005
ELECTRICAL BOX MOUNTING CLIP FOR USE WITH METAL STUDS
Wesley W. Swanquist, Oswego, Ill., assignor to All-Steel Equipment, Inc., a corporation of Illinois
Filed Aug. 20, 1965, Ser. No. 481,323
5 Claims. (Cl. 248—223)

ABSTRACT OF THE DISCLOSURE

The present invention relates to a mounting arrangement for boxes such as electrical outlet boxes, junction boxes, and other such housings and equipment.

The bracket, which is the subject matter of this application, is capable of interchangeable use with either channel or wire-type studding, both of which enjoy substantial use in the building trade at this time. The invention takes advantage of the inherent flexibility of these types of studding, by providing pairs of rigid ears which are constructed and arranged to be pressed onto the studding and provide a gripping pressure to hold the box to the stud.

---

The present application relates to a novel mounting arrangement for electrical outlet boxes directly to channel type, or steel wire type studding.

Current building trends, particularly in high rise constructions, dictate an increased use of steel wire studding or steel channel studding to permit walls, both of which permit sturdy wall construction, to be made thinner, thereby providing more usable space. Suitable lath such as steel or rod lath is secured to the studding and plaster is applied over the lath.

An object of the present invention is the provision of a novel clip which permits simplified mounting of outlet boxes and other electrical equipment directly to studding behind a wall.

It is another object of the invention to provide a novel mounting bracket which is readily and interchangeably usable on either steel channel studding or steel wire studding without modification thereof.

These and other objects and advantages of the present invention will become clear from the following detailed disclosure of the invention taken in conjunction with the drawings, wherein:

FIG. 4 illustrates the mounting of a box to steel wire studding as viewed through the studding in the direction of the box;

FIG. 5 is a blank from which the clip of the present invention is formed;

FIG. 6 is a section taken along line 6—6 of FIG. 4; and

FIG. 7 is an alternative embodiment of the clip in the drawing parallel to the side members as contrasted to the converging-diverging relationship of the members as illustrated in FIGS. 1 through 6.

Figure 1:
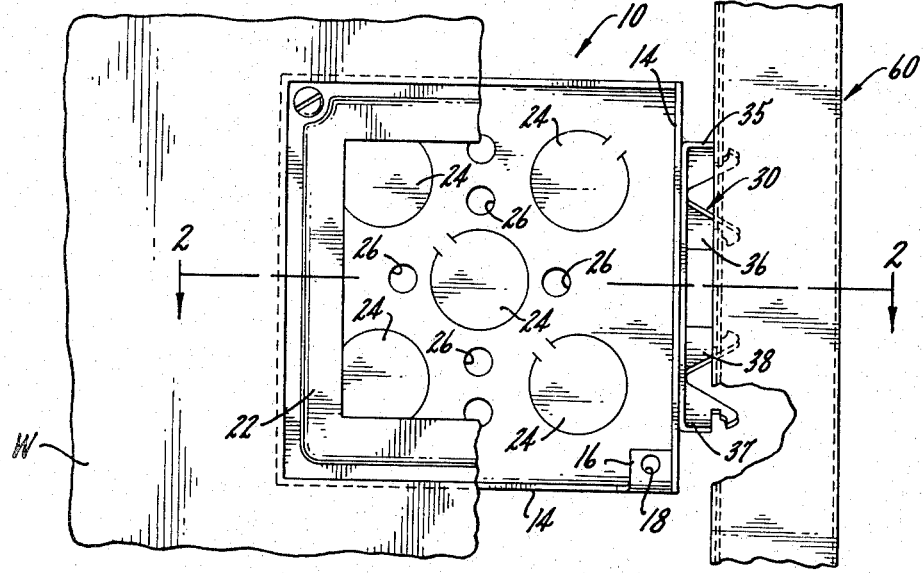
FIG. 1 is an elevation of the conventional outlet box having a clip thereon, constructed in accordance with the present invention, and illustrating the box as mounted behind a wall to a steel channelled stud.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Figure 2:
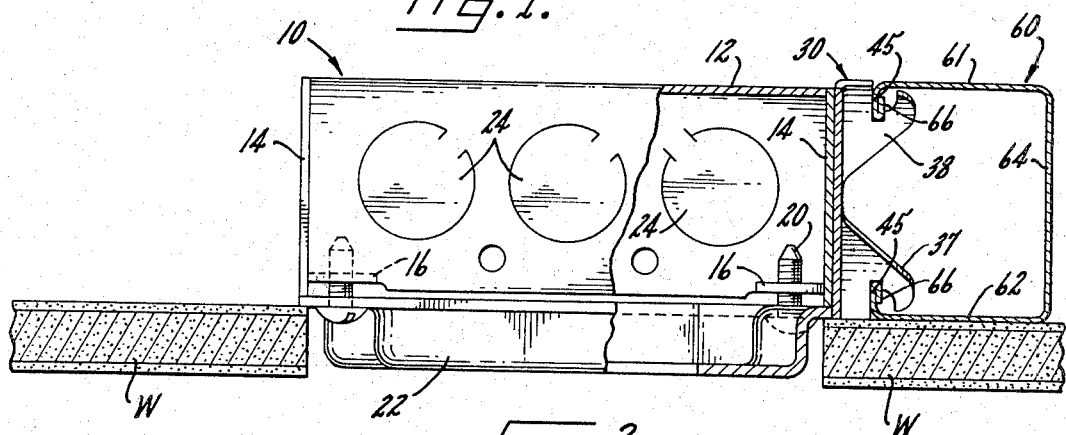
FIG. 2 is a section taken along line 2—2 of FIG. 1.

Referring specifically to the drawings, FIGS. 1 and 2 illustrate an outlet box of conventional design to which is secured a clip constructed in accordance with the present invention which permits the box to be interchangeably mounted to either wire or channel studding.

More particularly, with the reference to FIGS. 1 and 2, there is provided a conventional outlet box 10 having a bottom wall 12 and side walls 14. The box is open at its top, and in order to permit the mounting of a cover thereon, inturned ears 16 are provided at the corners, with suitable apertures 18 therein for the receipt of a fastener 20 adapted to hold a cover 22 to the box. The bottom and side walls of the box are, of course, provided with a plurality of knock-outs 24 and holes 26 through which conduit is passed in any convenient position behind the box to the interior of the box itself.

The clip which comprises the present invention is illustrated in blank form in FIG. 5, and bears the identifying character 30. As will be seen, a unitary flat metal blank may be employed and through appropriate stamping and bending operations, the clip assumes the configuration illustrated in FIGS. 1 through 4, or in the alternative form, FIG. 7.

Thus, the blank 30, through a suitable forming operation, comprises a backing plate 32 having a configuration identifiable as an isosceles trapezoid. A pair of ears extend outwardly from each of the non-parallel sides and are, for convenience, identified as 35, 36, 37 and 38. The ears 35 and 37 are constructed as to be mirror images of one another, as are the ears 36 and 38. The non-parallel sides 40 and 41 define fold lines along which the ears may be bent in any well known manner to the position which they occupy in the finished form, as illustrated in, for example, FIGS. 4 and 6.

It is a feature of the present invention that the clip which comprises the invention herein is mountable, without modification, to either channel studding or wire studding, and to this end, each of the ears 35, 36, 37 and 38 are formed with openings for engaging the studding for holding the box, to which the clip is attached, in place.

Again referring to FIG. 5, each opening or slot comprises two parts. The first part is a straight cut, bearing the number 35, and extending inwardly from the leading edge of each of the ears substantially parallel with the particular side to which the ear is attached. For example, the slot 45 in the ear 35, would commence from the leading edge 47 thereof and extend inwardly for an appropriate distance in a direction parallel with the side 40 of the clip 30. In a like manner, the slot 45 in the ear 36 extends from the leading edge 49 thereof, and is not only parallel with the side 40, but colinear with the slot 45 and the ear 35. The same identical relationship exists between the ears 37 and 38, and when the ears are bent with respect to the backing plate 32, to their substantially perpendicular position as indicated in FIG. 4, for example, all of the slots 45 will be disposed in the same plane, substantially parallel to the backing plate 32.

With reference to FIGS. 1 and 2, it is possible to observe the clip mounted to a steel channel stud of known construction, and bearing the identifying character 60. The stud, as its name suggests, is channel-shaped, having a pair of parallel side walls 62 extending from a bottom wall 64, and terminating in an inturned flange portion 66. As illustrated, the flange portions 66 are doubled back upon themselves. From the standpoint of the present invention, this detail of construction is of little importance. However, from FIG. 2 it will be readily observed that slots 45 are so designed as to readily accommodate the inturned flange portions 66 of the channel, thereby securing the clip to the channel itself. It is only necessary, in order to render the clip useful for the purpose intended, to connect the backing plate 32, in some appropriate fashion through a box 12. This may be readily accomplished by spot welding, brazing, or by the use of some appropriate fastener. It will also be readily appreciated that the box may be mounted in any desired position simply by securing the clip to a side which, when mounted to the available stud in the manner intended, will result in the box being positioned as desired.

Again referring to FIG. 5, and also to FIG. 6, each ear is likewise, in accordance with the invention, capable of engaging conventional wire studding in addition to the channel studding as previously discussed, and to this end, an arcuate sector 70 is removed from the ear, extending from the leading edge thereof, and coextensive with the slots 35 on the side thereof opposite the nonparallel side 40 or 31 to which the particular ear is attached. The sector 70 and slot 45 of each ear thus define a two stage opening with the inner stage defined by slot 45 being complementary to the shape of channel studding while the outer stage defined by sector 70 is complementary to the shape of wire type studding.

Further in keeping with the invention, the sectors 70 are so formed that when the ears are folded into their perpendicular position, slots in opposite ears become aligned and are parallel with the parallel sides of the plate 32. As a result, the entire wall of the slot will be fully engaged with the stud. To this end, when the blank of FIG. 5 is formed as indicated, sector 70 is punched at an angle which will depend on the angle which the nonparallel sides 40 and 31 form with the parallel sides at the backing plate 32.

As a result of the formation of the blank in the manner indicated, the clip is readily attachable to conventional wire studding, as illustrated particularly in FIGS. 4 and 6.

Figure 3:
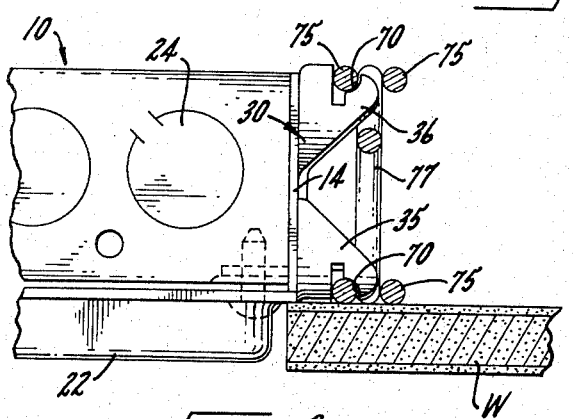
FIG. 3 is a partial section similar to FIG. 2, but showing the novel clip mounting a box to steel wire studding.

An exemplary steel wire stud is formed from a series of parallel small diameter steel wires or rods 75, which are strengthened by an internally disposed wire 77 bent into a generally saw-tooth configuration. As may be seen in FIG. 3, two sets of parallel wires 75 are disposed in spaced relation between a wire 77, and as seen in FIG. 3, the clip 30 engages a pair of such spaced wires 75 which lie in generally the same plane, thereby securing the clip to the studding.

It is an additional laudatory feature of the invention that, notwithstanding the saw-tooth wire 77, which adds rigidity to the studding, the clip, because of its trapezoidal configuration, is mountable in a maximum number of positions along the studding by virtue of the angular disposition of the sides 40 and 41, which avoid the saw tooth wire 77.

It will appear from FIG. 7, that an alternative embodiment in which the backing plate is rectangular as contrasted to an isosceles trapezoid configuration, is a satisfactory alternative.

Relating to the construction of FIG. 7, to the construction of the clip illustrated in FIG. 5, like parts will bear identical numbers in the hundred series. Thus, a rectangular backing plate 132 is provided, and from parallel sides 140 and 141 thereof, ears 135, 136, 137 and 138 extend. Wire studding formed of wires 175 and 177 is likewise illustrated. It will be appreciated that the particular position to which the configuration of FIG. 7 may be mounted on a wire stud may be more limited. It is not, however, limited in any way on a channel stud.

In order to permit "snap-on" engagement of the clip to studding, the leading edges of the ears along a given edge 40 or 41 are spaced a distance slightly greater than the dimension of the studding which they are to engage. As a consequence, the studding, which has some resiliency, is flexed or cammed outwardly by the rounded portion of the ear until it slips into the slot. Thus, the channel actually engages the clip, holding the same firmly in place under a slight pressure brought about by the initial flexing of the channel member as the clip is pressed thereagainst.

I claim as my invention:

1. A bracket for mounting a box to channel and wire-type studding, comprising a backing plate adapted to be fastened to a wall of the box, pairs of rigid ears standing outwardly from each of opposite sides of said backing plate, each ear having a two stage slotted opening of inner and outer different shapes defined therein, the outer stage being of a shape to engage a complementary-shaped portion of a wire type studding to which the box is to be attached, said inner stage having a shape to engage a complementary shaped portion of a channel type studding, said ears being pressable into engagement with the studding, and being so spaced from each other as to provide gripping pressure against the engaged portions of the stud for securing the box thereto.

2. For use in mounting a box to channel and wire-type studding, a bracket comprising a backing plate adapted to be fastened to a wall of the box, a pair of rigid ears extending outwardly from each of opposite sides of said backing plate, each said ear having a leading edge thereof, and an opening of generally circular segmented configuration generated inwardly from said leading edge, pairs of said openings being aligned for engagement with a complementary-shaped portion of a stud, a second opening adjacent said first-named opening comprising an elongated narrow slot extending inwardly from said leading edge and disposed in a plane parallel with said backing plate, said ears being spaced to provide gripping pressure against the engaged portions of the stud for securing the box thereto.

3. A bracket as set forth in claim 2 wherein said backing plate has a trapezoidal shape, and said ears project from the non-parallel sides thereof.

4. A bracket as set forth in claim 2 wherein said backing plate is rectangular, and said ears project from opposite sides thereof, pairs of ears on one side lying in a plane which is perpendicular to the wall of the box to which said bracket is attached.

5. A bracket as set forth in claim 2 wherein said opening comprises a cut extending into said ear at right angles to the leading edge thereof, and a sector of said ear adjacent said leading edge being removed so that when said ear is extended upwardly from said backing plate, the sector will be aligned with the sector in an ear extending from the opposite side of said backing plate.

References Cited

UNITED STATES PATENTS 1,930,242  10/1933  Lademann _____ 248—205
2,721,245  10/1955  Arisman _____ 248—27 X CHANCELLOR E. HARRIS, *Primary Examiner.*